United States Patent [19]

Yoshimura et al.

[11] Patent Number: 5,442,397
[45] Date of Patent: Aug. 15, 1995

[54] IMAGE SENSING APPARATUS

[75] Inventors: Katsuji Yoshimura; Masamichi Toyama; Akihiro Fujiwara; Hirofumi Suda, all of Kanagawa; Kunihiko Yamada, Tokyo; Kitahiro Kaneda, Kanagawa; Hideo Homma, Tokyo, all of Japan

[73] Assignee: Canon Kabushiki Kaisha, Tokyo, Japan

[21] Appl. No.: 245,813

[22] Filed: May 18, 1994

Related U.S. Application Data

[63] Continuation of Ser. No. 99,807, Jul. 29, 1993, abandoned, which is a continuation of Ser. No. 808,045, Dec. 12, 1991, abandoned, which is a continuation of Ser. No. 319,546, Mar. 6, 1989, abandoned.

[30] Foreign Application Priority Data

Mar. 11, 1988 [JP] Japan .................................. 63-57760
May 2, 1988 [JP] Japan .................................. 63-109642

[51] Int. Cl.⁶ .............................................. H04N 5/232
[52] U.S. Cl. .................................... 348/363; 348/362; 250/201.2
[58] Field of Search .............................. 348/363, 362; 250/201.2, 203.1, 203.3, 203.6, 203.7, 203.5; 354/403

[56] References Cited

U.S. PATENT DOCUMENTS

| | | | |
|---|---|---|---|
| 3,953,669 | 4/1976 | Saccomani et al. | 250/203.5 |
| 3,955,046 | 5/1976 | Ingham et al. | 250/203.5 |
| 4,053,929 | 10/1977 | Collins, III et al. | 250/203.5 |
| 4,220,967 | 9/1980 | Ichida et al. | 358/125 |
| 4,719,584 | 1/1988 | Rue et al. | 358/125 |
| 4,831,403 | 5/1989 | Ishida et al. | 354/403 |
| 4,899,194 | 2/1990 | Hori | 358/227 |
| 5,339,163 | 8/1994 | Homma et al. | 348/367 |
| 5,343,246 | 8/1994 | Arai et al. | 348/463 |
| 5,353,058 | 10/1994 | Takei | 348/363 |

Primary Examiner—Edward L. Coles, Sr.
Assistant Examiner—Fan Lee
Attorney, Agent, or Firm—Robin, Blecker, Daley & Driscoll

[57] ABSTRACT

An image sensing apparatus operating with adaptive selection of a first tracing algorithm in which an object image is traced by moving a detecting area capable of being movably set on an image sensing plane in such a manner that the luminance level difference between the inside and the outside of that area becomes maximum and a second tracing algorithm in which the object image is traced by moving the position of the detecting area in such a manner that a point at which a contrast becomes maximum comes to coincide with a central portion of the detecting are depending on the state of the image sensing plane. The threshold values for changing over between the first tracing algorithm and the second tracing algorithm are made to have a hysteresis characteristic.

50 Claims, 13 Drawing Sheets

IMAGE SENSING APPARATUS

This is a continuation under 37 CFR 1.62 of prior application Ser No.08/099,807, filed Jul. 29, 1993 (now abandoned), which is a continuation of Ser. No. 07/808,045 filed Dec. 12, 1991 (now aban.), which is a continuation of Ser. No. 07/319,546, filed Mar. 6, 1989 (now aban.).

BACKGROUND OF THE INVENTION

1. Field of the Invention

This invention relates to an image sensing apparatus in which as an object image moves on the image sensing plane, a focus detecting area, or the like is made to continue being adjusted to the object by tracing (tracking) the moving of the object image.

2. Description of the Related Art

In the imaging instruments such as video cameras, it has been known to use a high frequency component of the video signal in detecting the degree of sharpness of an object image at the image sensing plane, by which the position of a focusing lens is controlled so as to maximize the magnitude of that high frequency component, so that the camera is automatically controlled to come into an in-focus state. In more detail, the video signal changes rapidly at or near the boundary line of the object with the result that its high frequency component increases. It is proven that under the condition of increasing of its high frequency component, the higher the level of the video signal, the nearer the focusing lens lies to the in-focus state.

When shooting an object, if, as the object is moving, or the camera is moving, the object appears to move relative to the camera, the high frequency component will be lowered by that motion, or if the object goes out of the focus detecting area, the automatic focus adjusting device will be caused to focus on another object. To overcome such very demanding problems, there has been a previous proposal for making the focus detecting area trace (track) the moving object as long as motion of the object is detected, so that despite the motion of the object, the automatic tracing device enables the focusing lens to continue focusing on the aimed object.

In the prior-known tracing devices, many methods have been proposed, for example, in which the color, luminance, or other feature, sampled at a moment, of the object is memorized and then compared with that sampled at the next moment to detect whether or not the object has moved. Another method is that the comparison is made in vertical and horizontal correlation with respect to different times.

However, these methods have many problems in that many situations where the feature of the object cannot accurately be detected are encountered, in that the construction of the device becomes complicated, and in that the required size of the memory is relatively large.

To overcome those problems, a method has been proposed in which a designated area is set on the image sensing plane, then the difference in the average video signal level between the outside and the inside of the designated area is determined, and then the focus detecting area is moved so that the difference reaches the maximum. The use of this method simplifies the structure of construction, thus achieving a great advance in the art.

From later experiments and investigation, however, it has been found out that to apply to actual practice the above-described object tracing method based on the average level difference in the video signal between the outside and the inside of the designated area, there is much room for further improvement.

That is, in a situation where the luminance difference between the object and its background is small, the object tracing device is very susceptible to the influence of another object. Hence, the accuracy and reliability of detection for motion of the object is so lowered that sufficient ability to keep focusing on the aimed object cannot be obtained at any speed of movement of the object.

Meanwhile, in the video camera, the focusing position of the photographic lens is controlled by a method in which the degree of sharpness of the optical image on the image sensing plane is determined by the high frequency component of the output video signal, and then a maximum value of the high frequency component is sought, and the size of aperture opening of the iris is controlled by a method in which the level of average luminance of the output video signal is used. In these methods, all the video signals over the entire area of the picture frame are required to be processed. Differing from these methods, there have been previous proposals for a spot method of distance and light measurement (as in, for example, Japanese Patent Applications Nos. Sho 62-277382 and 62-277384) wherein the object detecting area is moved on the image sensing plane so as to maximize the difference in the average video signal level between the inside and the outside of a designated area on the image sensing plane, and a distance measuring area or a light measuring area is set on the basis of the video signal from that object detecting area.

The above-described spot method relies on the general premise that the level of the video signal for the object differs largely from the level of the video signal for its background. When the difference in video signal level between the object and its background is small, a problem will arise in which the accuracy of tracing control to the moving object is very much lowered.

Patent applications related to the invention are as follows:

On the tracing (tracking), there are U.S. patent applications Ser. Nos.:
  737,163 filed on May 23, 1985 (tracing by extracting a feature point);
  106,427 filed on Oct. 8, 1987 (peak tracing);
  240,915 filed on Sep. 6, 1988 (tracing by luminance difference); and
  237,511 filed on Aug. 26, 1988 (detecting of motion of the image).

As another example of application of the tracing technique to the automatic exposure apparatus, there is U.S. patent application Ser. No. 264,204 filed on Oct. 28, 1988.

Further, on the general case of auto focusing, there are U.S. Pat. No. 4,762,986 and U.S. patent applications Ser. Nos.:
  017,183 filed on Feb. 19, 1987;
  046,252 filed on May 5, 1987;
  107,451 filed on Oct. 8, 1987;
  121,624 filed on Nov. 17, 1987;
  154,078 filed on Feb. 9, 1988; and
  154,795 filed on Feb. 11, 1988.

SUMMARY OF THE INVENTION

The present invention has been made to eliminate the above-described problems. Its first object is to improve the performance of tracing (tracking) an object to be photographed in the image sensing plane.

Another object of the invention is to provide an image sensing apparatus which enables an object tracing performance properly suited to the situation of an image sensing plane to be obtained.

Still another object is to provide an image sensing apparatus in which, even when the difference in average luminance between the object and the background is so small that motion of the object is hard to detect, the object can be traced with high reliability as the apparatus is changed over to the tracing mode based on the peak value.

Under such a situation, according to a preferred embodiment of the invention, an object tracing device for tracing an object image on an image sensing plane is disclosed, comprising means for movably setting a detecting area on the image sensing plane, first object tracing means for varying a set position of the detecting area on the image sensing plane so that the difference in luminance level between the inside and the outside of the detecting area becomes greater, second object tracing means for varying the set position of the detecting area on the image sensing plane so that a position at which a contrast on the image sensing plane becomes maximum coincides with a central portion of the detecting area, and control means for selectively operating one of the first object tracing means and the second object tracing means.

A further object of the invention is to provide an automatic focusing device which enables sharp focus to be kept on a moving object regardless of whatever the state of the image sensing plane.

Under such a situation, according to a preferred embodiment of the invention, an object tracing type automatic focusing device is disclosed in which while tracing an object image on an image sensing plane, the object image is kept in an in-focus state, the device comprising means for movably setting a focus detecting area on the image sensing plane, means for movably setting an object tracing area on the image sensing plane, first object tracing means for varying a set position of the object tracing area on the image sensing plane so that there is a difference in luminance level between the inside and the outside of the object tracing area, second object tracing means for varying the set position of the object tracing area on the image sensing plane so that a position at which a contrast on the image sensing plane becomes maximum coincides with a central portion of the object tracing area, control means for selectively operating the first object tracing means and the second object tracing means, and means for setting the focus detecting area to a position of the object tracing area.

Another object of the invention is to provide an object tracing device which, despite a small difference in the level of the video signal between the object and the background, can trace the object by one of two tracing modes, whereby the threshold value for changing over between the two tracing modes is made to have a hysteresis characteristic such that switching from one tracing mode to the other can be carried out smoothly.

Yet another object of the invention is to provide an object tracing device in which, even when the difference in the level of average of the video signal between the object and the background is small, maintenance of good object tracking can be realized and, because of the use of the hysteresis characteristic in changing over between the tracing modes, frequent repetitions of mode change are prevented from occurring so that the provision of switched tracing modes does not lead to an abnormal performance of the operation.

Under such a situation, according to a preferred embodiment of the invention, an object tracing device for tracing an object image on an image sensing plane, is disclosed, comprising first object tracing means for varying a set position of a detecting area on the image sensing plane so that the difference in luminance level between the inside and the outside of the detecting area increases, second object tracing means for varying the set position of the detecting area on the image sensing plane so that a position at which a contrast on the image sensing plane becomes maximum coincides with a central portion of the detecting area, and control means for selectively operating one of the first object tracing means and the second object tracing means, wherein a selecting operation of the control means has a hysteresis characteristic in which a threshold value at which a selection is changed from the first object tracing means to the second object tracing means differs from a threshold value at which a selection is changed from the second object tracing means to the first object tracing means.

Other objects and features of the invention will become apparent from the following description and the drawings.

DETAILED DESCRIPTION OF THE PREFERRED EMBODIMENTS

The invention is next described in great detail in connection with embodiments thereof with reference to the drawings.

FIG. 1 through FIG. 7 show a first embodiment of the automatic focusing device of the invention.

This embodiment is an automatic focusing device operating with suitable selection of first object tracing means and second object tracing means of respective different algorithms according to the situation of the image sensing plane, so that a highly precise and optimum tracing (tracking) of the object is carried out, thereby it being made possible to set the focus detecting area to the object image with high accuracy and reliability.

Figure 1:
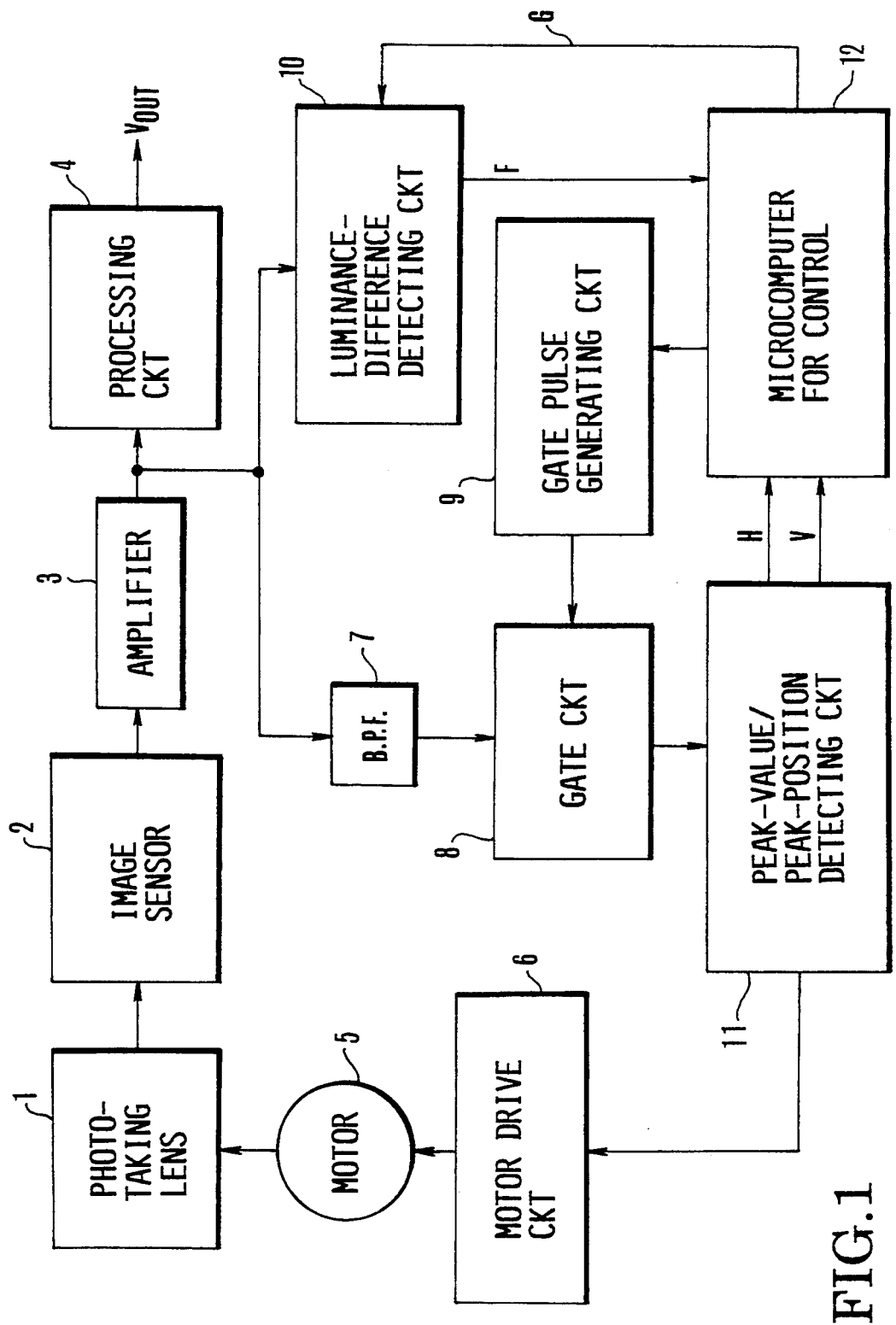
FIG. 1 is a block diagram illustrating a first embodiment of an automatic focusing device according to the invention.
Figure 4:
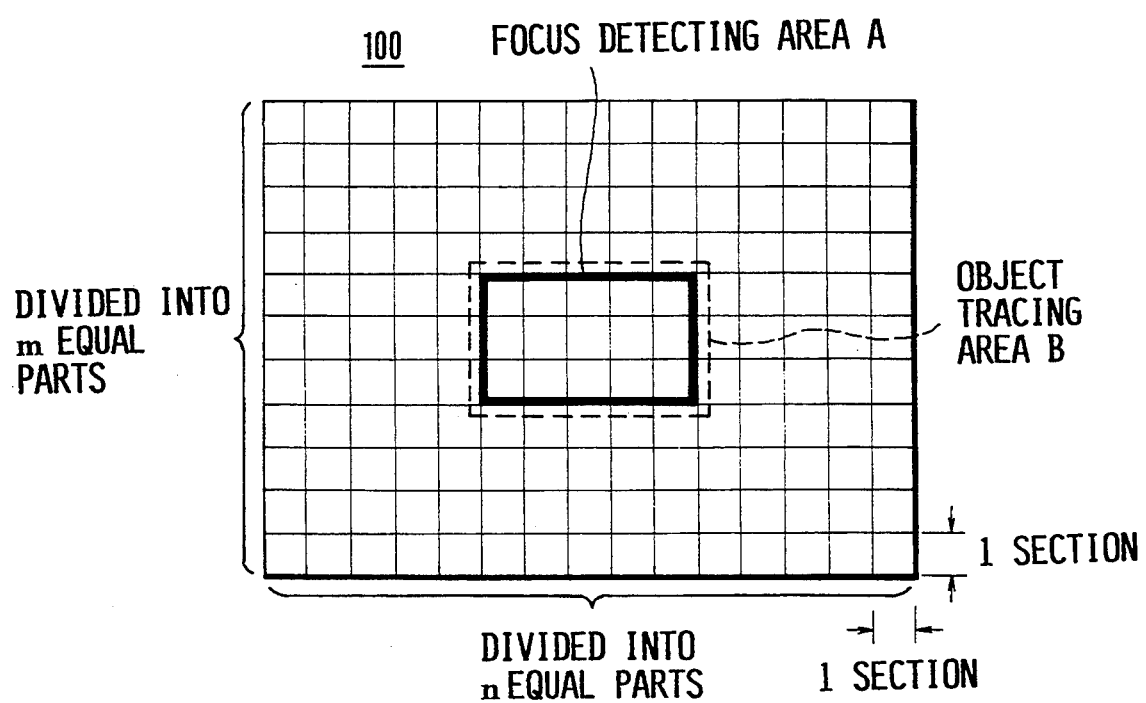
FIG. 4 is a plan view for explaining the image sensing plane.

In the automatic focusing device of this embodiment, as shown in FIG. 4, a focus detecting area A for focus adjustment and an object tracing area B responsive to detection of motion of an object for tracing the object are arranged to be movably set on an image sensing plane 100, wherein the position of the object is detected by the object tracing area B and the focus detecting area A is brought into coincidence with that object. FIG. 1 in block diagram shows the construction of one embodiment of the automatic focusing device according to the invention.

In FIG. 1, a lens 1 for focusing is adjusted in position by a motor 5. An image sensor 2 such as a CCD converts an object image formed on the image receiving surface thereof by the lens 1 into electrical signals which are output in the form of video signals. An amplifier 3 amplifies the video signals output from the image sensor 2. A processing circuit 4 applies gamma correction, blanking treatment, addition of synchronizing signals and others to the video signals output from the amplifier 3 to produce television signals which are supplied to a video output terminal Vout. A band-pass filter 7 extracts a high-frequency component required for focus detection from the video signals output from the amplifier 3. Instead of the band-pass filter 7, a differentiation circuit and an absolute value circuit for producing an output representing the absolute value of the output of the former circuit may be used. A gate circuit 8 responsive to gate pulses from a gate pulse generating circuit 9 supplies the video signals obtained from the inside of the focus detecting area A among one field of video signals to a peak-value/peak-position detecting circuit 11. This, when viewed on the image sensing plane 100, extracts only signals within a predetermined area on the image sensing plane and supplies them to the peak-value/peak-position detecting circuit 11. Detailed explanation will later be given the peak-value/peak-position detecting circuit 11. A position representing the highest level among the outputs of the gate circuit 8 in a field period is supplied by the peak-value/peak-position detecting circuit 11 in the form of horizontal and vertical position information H and V each to a microcomputer 12, while that highest level is supplied by the peak-value/peak-position detecting circuit 11 to a motor drive circuit 6. A luminance difference detecting circuit 10, which will also later be described in greater detail, receives a data signal G from the microcomputer 12 and calculates the difference in the level of average luminance between the inside and outside of the object tracing area B on the image sensing plane. Data F representing this difference is supplied to the microcomputer 12. Based on the peak position information and the luminance difference between the inside and outside of the object tracing area B, the microcomputer 12 controls the gate pulse generating circuit 9 to adjust the position of the focus detecting area A on the image sensing plane. The motor drive circuit 6 responsive to the peak value of contrast supplied from the peak-value/peak-position detecting circuit 11 in each field period determines the direction in which the motor 5 is to be driven in a manner like the hill climb servo control so that the peak value becomes maximum.

Figure 2:
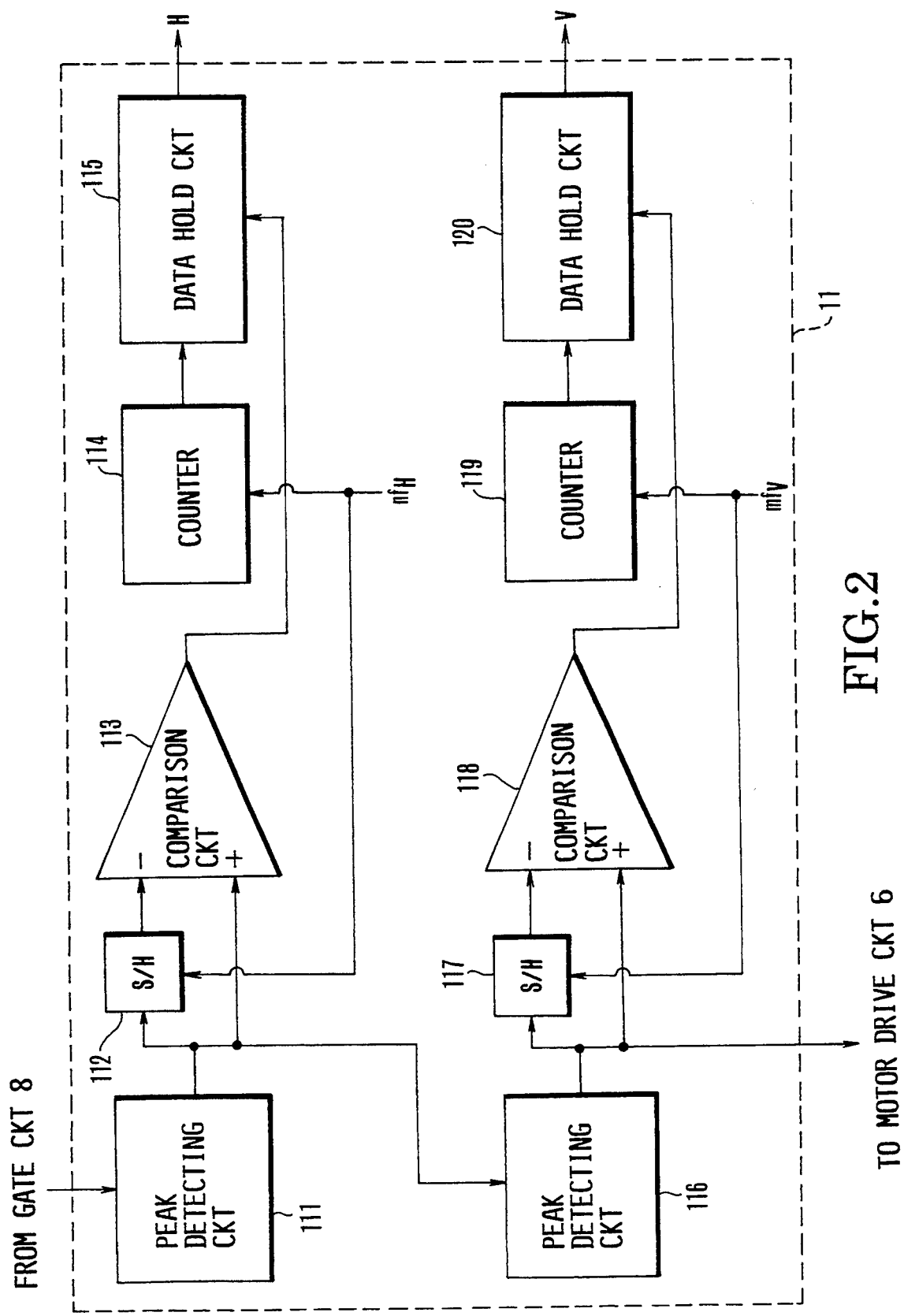
FIG. 2 is a block diagram illustrating the internal construction of the peak-value/peak-position detecting circuit in the block diagram shown in FIG. 1.

Next, the details of the peak-value/peak-position detecting circuit 11 are explained with reference to FIG. 2. The output of the gate circuit 8 is supplied to a first peak detecting circuit 111.

This peak detecting circuit 111, while detecting the high-frequency component obtained by the BPF 7, holds the peak value of the input signal in every one horizontal scanning of the focus detecting area A. Referring to the sectionalized state of the image sensing plane 100 in FIG. 4, a sample-and-hold circuit 112 holds the output value of the peak detecting circuit 111 by a clock of a frequency equal to n times the horizontal scanning frequency $f_H$ corresponding to the horizontal division of FIG. 4. By a comparison circuit 113, the output of this sample-and-hold circuit 112 is compared with the output of the peak detecting circuit 111. The comparison circuit 113 produces a pulse signal which rises in such timing as the output of the peak detecting circuit 111 changes. The change of the output of the peak detecting circuit 111 implies that the changing portion of all output occurs at a boundary of a certain kind of the object image. The steeper that change, the nearer the lens 1 is to the in-focus state.

A counter 114 counts a clock of a frequency $nf_H$. A data hold circuit 115 holds the counted value of the counter 114 in response to the pulse signal output from the comparison circuit 113. The held value H of the data hold circuit 115 indicates which of the horizontal sections of n division has contributed to the change of the output of the peak detecting circuit 111 (i.e., to the peak of the output of the BPF 7) by the number of counted pulses. In the illustrated example, if there are a plurality of peaks in the horizontal direction within the focus detecting area A, it indicates the position of the maximum one of these peaks.

A second peak detecting circuit 116 receives the output of the first peak detecting circuit 111 and holds a peak value obtained in the vertical direction within the focus detecting area A. A sample-and-hold circuit 117 and a comparison circuit 118, similarly to the sample-and-hold circuit 112 and the comparison circuit 113, forms a signal representing a point in time at which the output of the peak detecting circuit 116 changes, where the frequency of a sampling clock for the sample-and-hold circuit 117 is m times (corresponding to the number of divided parts in the vertical direction of FIG. 4) as large as the frequency $f_V$ of the vertical synchronizing signal. As a result, the output of the comparison circuit 118 indicates which of the vertical sections has contributed to the change of the output of the peak detecting circuit 116.

A counter 119 counts a clock of the frequency $mf_V$. A data hold circuit 120 holds the held value of the counter 119 in response to the pulse signal output from the comparison circuit 118. The held value V of the data hold circuit 120 indicates in which of the vertical sections of m division the peak detected by the change of the output of the peak detecting circuit 116 (i.e., the peak of the output of the BPF 7) takes its position. In the case of the illustrated example, if there are a plurality of peaks in the vertical directions within the focus detecting area A, it indicates the position of the maximum one of these peaks.

Though not illustrated, the counter 114 is cleared at the start time of the horizontal scanning, while the peak detecting circuits 111 and 116 and the counter 119 are cleared at the start time of the vertical scanning.

It is to be noted that the peak value to be detected by the peak detecting circuit 116 is the maximum value over all the area of the image sensing plane, being supplied as a signal representing the degree of focus to the motor drive circuit 6.

Figure 3:
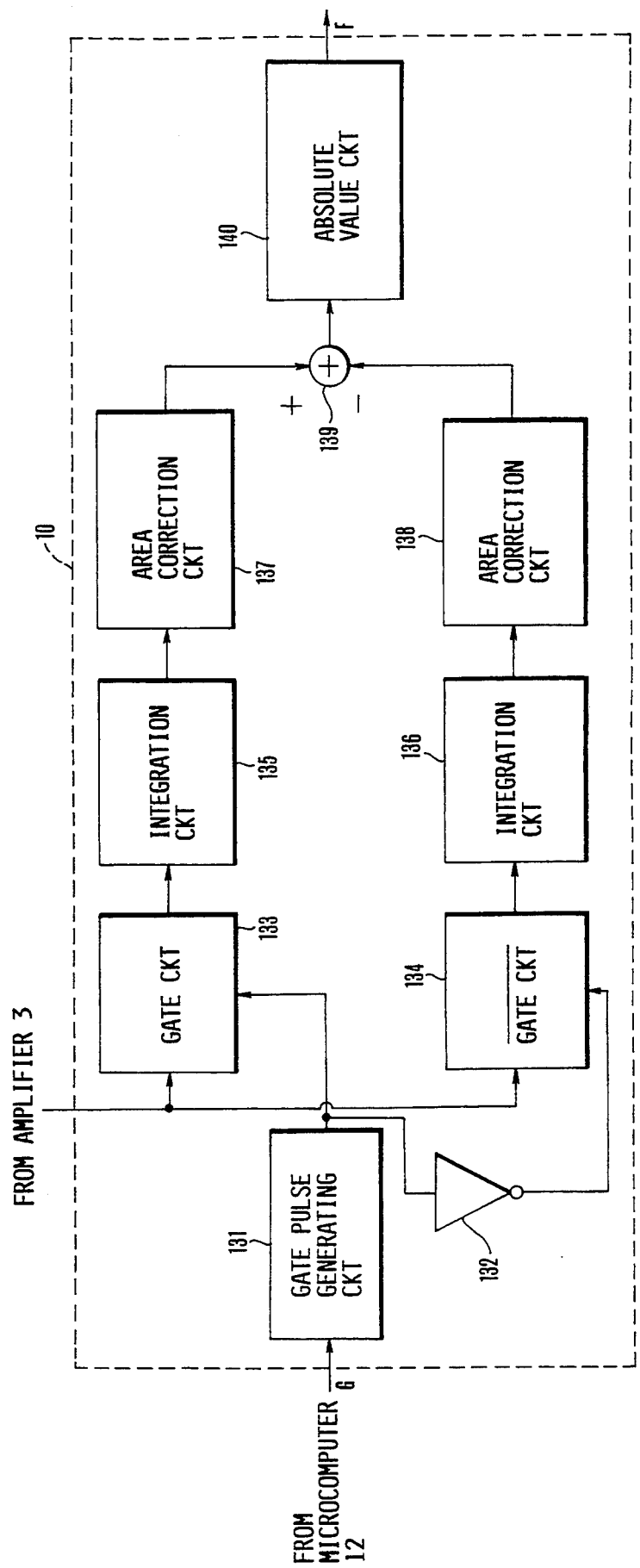
FIG. 3 is a block diagram illustrating the internal construction of the luminance-difference detecting circuit 10 in the block diagram shown in FIG. 1.

Next, the details of the luminance difference detecting circuit 10 are explained with reference to FIG. 3. In FIG. 3, a luminance component of the video signal output from the amplifier 3 is supplied to a gate circuit 133. A gate pulse generating circuit 131 forms a gate pulse corresponding to the position of the object tracing area B on the image sensing plane indicated by a control signal G output from the microcomputer 12. Responsive to this gate pulse, the gate circuit 133 supplies the video signals obtained from the inside of the object tracing area B among one field of video signals to an integration circuit 135. Subsequently, the integration circuit 135 supplies its integration output to an area correction circuit 137 for normalizing the integrated value by the area of the object tracing area B. Also, responsive to the inverted gate pulse from the gate pulse generating circuit 31 by an inverter 132, an inversion gate circuit 134 supplies the video signals obtained from a designated area other than the object tracing area B defined by the gate circuit 133 among one field of video signals (i.e., from the entirety of the image sensing plane except the object tracing area) to an integration circuit 136. Subsequently, the integration circuit 136 supplies its integration output to an area correction circuit 138 for normalizing the integrated value by the area of the designated area. The area correction circuits 137 and 138 are used because, as the inner and outer areas of each gate are different from each other, the outputs of the integration circuits 135 and 136 cannot be compared directly with each other, so that each integrated value is normalized by the area of the region from which it has been extracted. Thus, they are made to be of comparable form. In a subtracting circuit 139 to which the signals output from the area correction circuits 137 and 138 are supplied, the difference between the outputs of the area correction circuits 137 and 138 is obtained. This difference information is supplied to an absolute value circuit 140. Data F output from the absolute value circuit 140 is supplied to the microcomputer 12.

Figure 6:
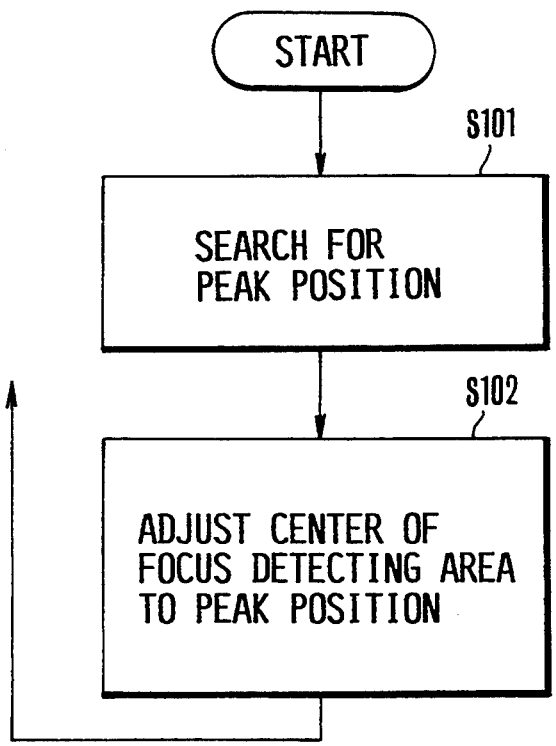
FIG. 6 is a flowchart for a contrast tracing algorithm.
Figure 7:
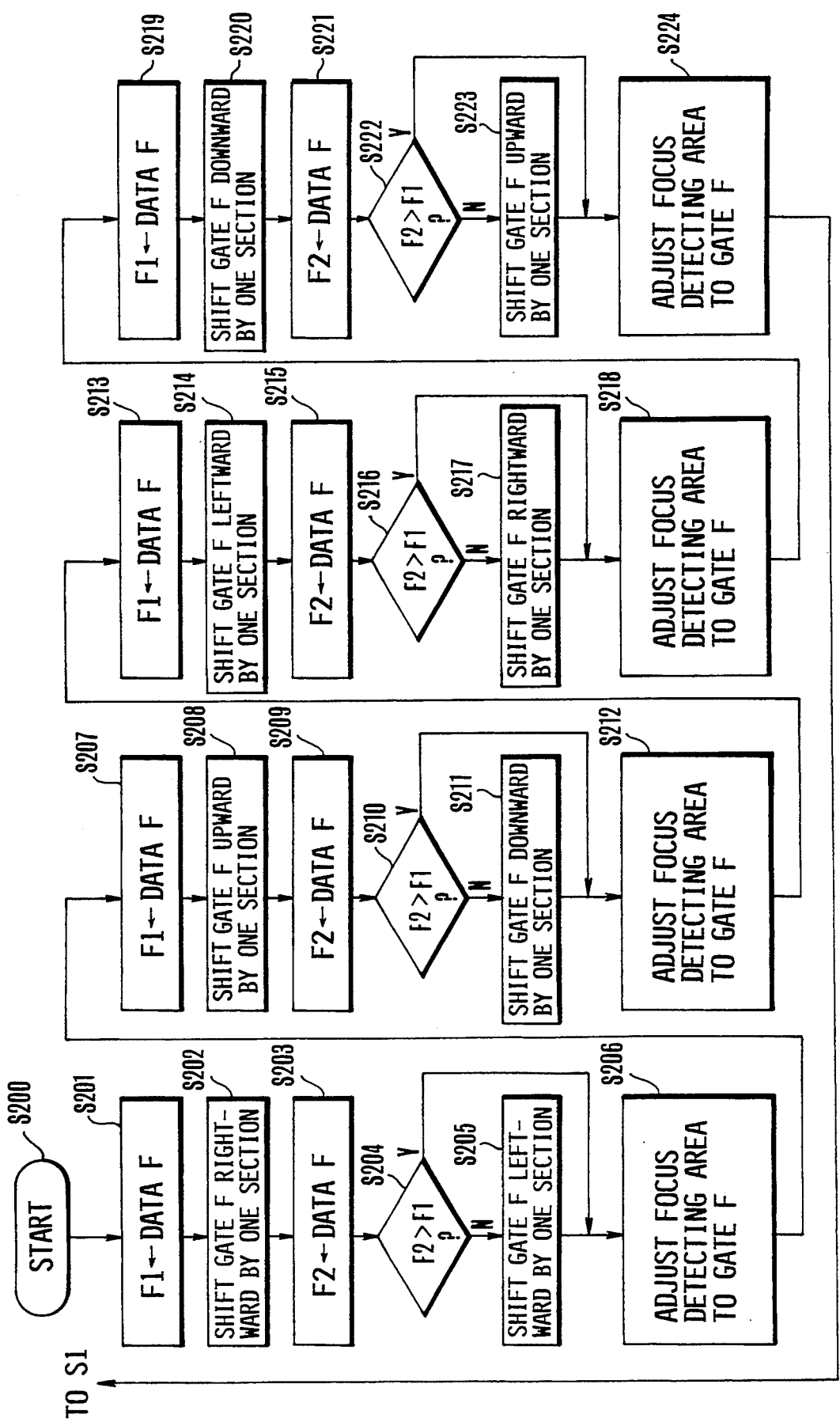
FIG. 7 is a flowchart for a luminance-difference tracing algorithm.

Next, the tracing algorithm for the microcomputer 12 is explained with reference to FIG. 5 through FIG. 7.

Figure 5:
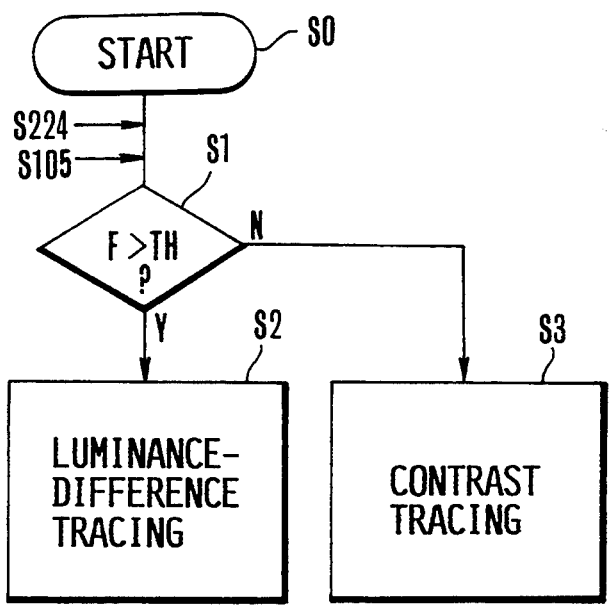
FIG. 5 is a flowchart illustrating an algorithm for selecting the tracing modes.

FIG. 5 is a tracing mode selection algorithm. In a step S1, the difference in the average luminance between the inside and the outside of the object tracing area B computed by the luminance-difference detecting circuit 10 (hereinafter called "data F") is compared with a predetermined threshold value TH. If the data F is larger than the value TH, then the process advances to a step S2 for a luminance-difference tracing algorithm. If it is not larger than the value TH, then the process advances to another step S3 for a contrast tracing algorithm. FIG. 6 shows the contrast tracing algorithm. In a step S101, the peak position is searched for on the basis of the horizontal and vertical coordinates of a peak position on the image sensing plane supplied from the peak-value/-peak-position detecting circuit 11. In a step S102, the gate pulse generating circuit 9 is controlled so that the center of the focus detecting area A comes to coincide with the peak position found in the step S101. Then the process returns to the step S1 of FIG. 5. FIG. 7 shows the luminance-difference tracing algorithm. Prior to the explanation of the flowchart, the principle is briefly described. The object tracing area B is shifted, for example, section by section upward, downward, leftward and rightward. The data obtained from the successive two of these positions is examined to find in which direction the object has moved, as the absolute value of the difference in the average luminance level between the inside and the outside of the object tracing area B increases to the maximum. Then, the focus detecting area A is moved by one section in that direction. In the following, the flowchart of FIG. 7 is explained. In a step S201, the data F supplied from the luminance-difference detecting circuit 10 is taken in, being labeled as F1. In the next step S202, a command for shifting the object tracing area B by one section to the right on the image sensing plane shown in FIG. 4 is sent to the luminance-difference detecting circuit 10. In a step S203, data F is taken in again, being labeled as F2. In the next step S204, which of the values F1 and F2 is larger is determined. If F2>F1, then the process advances to a step S206. If F2≦F1, then the object tracing area B is shifted by one section to the left in a step S205. After that, the focus detecting area A is brought into coincidence with the object tracing area B in the step S206. Subsequently, in a similar manner, in a step S207 through a step S212, a shifting by one section upward is effected with the result based on which the object tracing area B is moved. In a step S213 through a step S218, a shifting by one section to the left is then effected with the result based on which direction the object tracing area B is moved. In a step S219 through a step S224, a shifting by one section downward is then effected with the result based on which direction the object tracing area B is moved. Then the process returns to the step S1 of FIG. 5.

Such a procedure is repeated until the object tracing area B reaches the position at which the luminance difference between its inside and its outside takes the maximum value. Thus, the object continues being traced (tracked). This data F is then supplied to the microcomputer 12. Responsive to the indication from the microcomputer 12, the gate circuit 8 controls the gate pulse generating circuit 9. Depending on the gate pulse output from the gate pulse generating circuit 9, the video signals obtained from the inside of the focus detecting area A among one field of video signals are permitted to pass the gate circuit 8. By this, the focus detecting area A can be set to the position of the object tracing area B. Thus it is made possible, despite motion of the object, to keep the sharp focus of the lens 1 on it.

It should be noted that though, in the above-described embodiment, a tracing area is made to trace the object to detect the position of the object and the focus detecting area is then set to that position, the focus detecting area and the object tracing area may otherwise not be controlled individually but replaced by a common area without causing anything disadvantageous in the embodiment of the invention.

It should also be noted that in another possible variation, the focus detecting area may be used in common with, for example, a light quantity detecting area.

As has been described above, according to the automatic focusing device in the invention, even in a case where the average luminance difference between the object and the background is so small that motion of the object is hard to detect, when the tracing mode using the peak value is selectively operated, it is assured that the object can be traced accurately. In all situations which are encountered, therefore, sharp focusing can be applied to the moving object with high accuracy and reliability.

Another advantage is that a memory of large scale which would otherwise be required for detecting the motion of the object is no longer necessary, thus simplifying the structure.

Next, FIG. 8 through FIG. 14 show a second embodiment of the automatic focusing device according to the invention.

In this embodiment, two object tracing modes of different algorithms are adaptively selected to operate depending on the situation of the image sensing plane, thereby possible that the image sensing apparatus is always able to detect the object position in the best condition to which the focus detecting area, etc., is set. When switching from one of the two object tracing modes to the other, or vice versa, the respective threshold value for each of the switching directions is made to have a hysteresis characteristic, thus achieving an improvement for better stabilization of the tracing operation.

Figure 8:
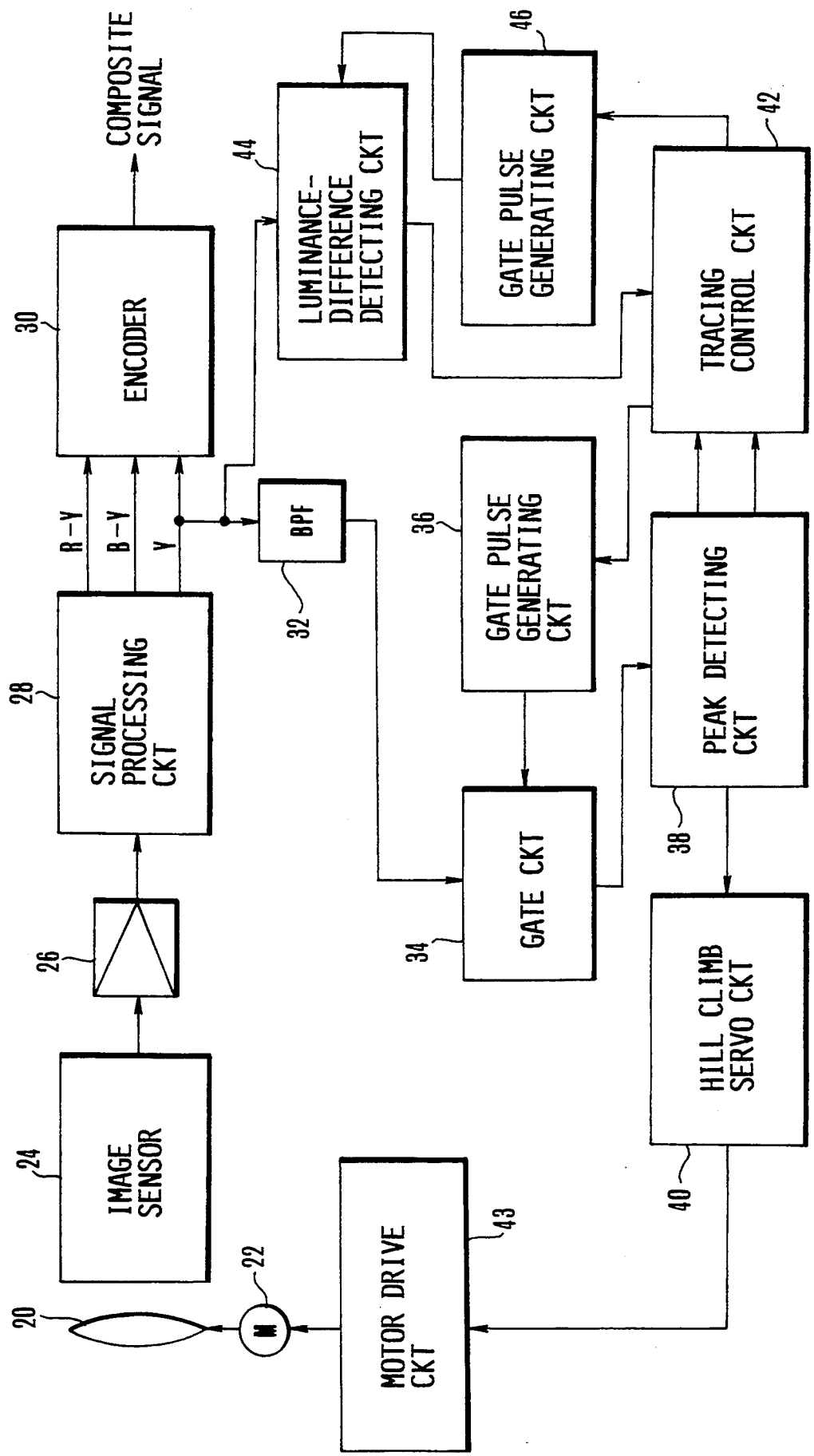
FIG. 8 is a block diagram of the construction of a second embodiment of the invention.

FIG. 8 in block diagram shows the construction of the second embodiment of the invention applied to focus adjustment. In FIG. 8, a lens 20 for focusing is adjusted in position by a motor 22. An image sensor 24 such as a CCD converts an optical image formed on the image receiving surface thereof by the lens 20 into an electrical signal which is output in the form of video signals. A signal processing circuit 28 converts the output of the amplifier 26 into a luminance signal Y and two color-difference signals (R-Y) and (B-Y). An encoder 30 converts the component signals output from the signal processing circuit 28 into a composite signal.

Figure 11:
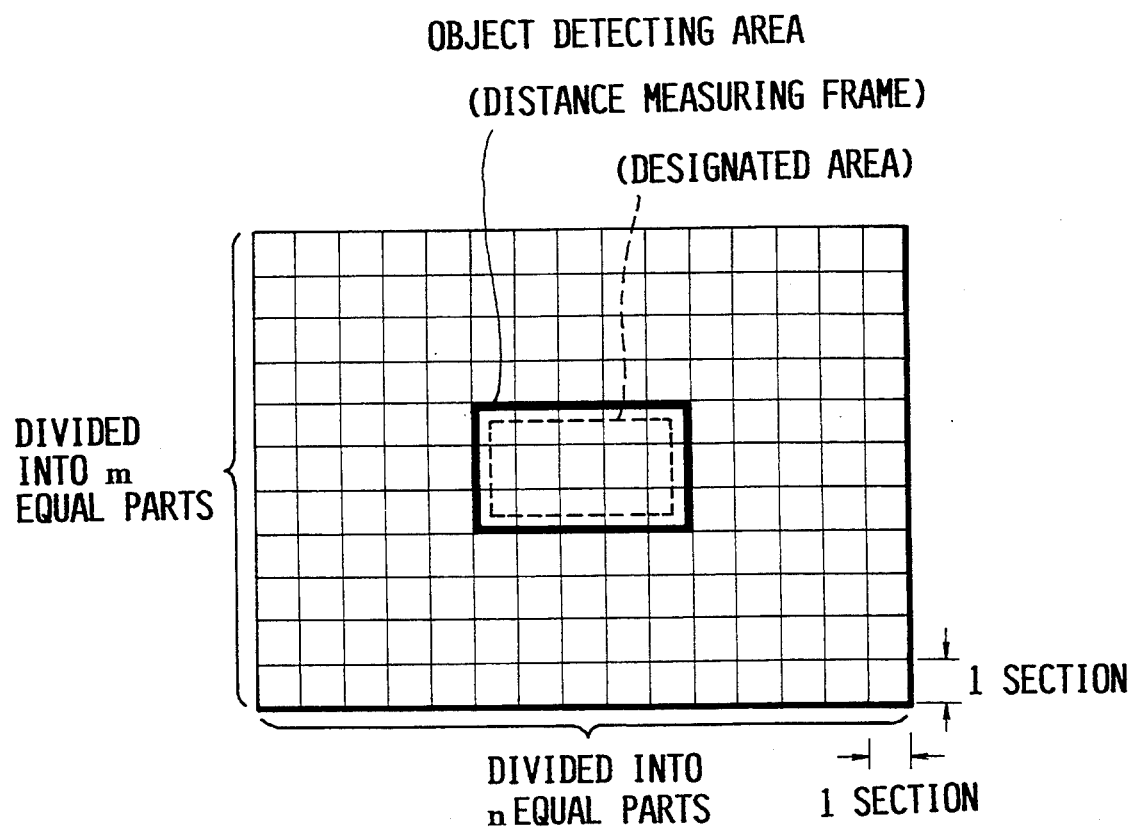
FIG. 11 is a plan view for explaining the division of the image sensing plane into a number of sections.

A BPF 32 extracts a high-frequency component from the luminance signal Y and supplies it to a gate circuit 34. The gate circuit 34, responsive to a gate pulse output from a gate pulse generating circuit 36, causes passage of the video signals corresponding to the inside of a distance measuring area within a distance measuring frame set at a predetermined position on an image sensing plane as shown in FIG. 11. A peak detecting circuit 38, which will more fully be described later, detects a maximum peak value and its position in each field period among the signals which have passed the gate circuit 34. The peak value is supplied to a hill climb servo circuit 40, while the horizontal and vertical peak position information is supplied to a tracing control circuit 42. The hill climb servo circuit 40 compares the peak value of the present field with the peak value of the last field to determine the direction in which the lens 20 is to be moved. A motor drive circuit 43 drives the motor 22 in the determined direction of movement.

A luminance-difference detecting circuit 44, responsive to the gate pulse output from the gate pulse generating circuit 46, calculates the difference in the level of average luminance between the inside and the outside of a designated area (object detecting area) in a predetermined position on the image sensing plane as shown in FIG. 11. The calculation result is supplied to the tracing control circuit 42. The tracing control circuit 42, which will more fully be described later, controls the gate pulse generating circuits 36 and 46 in accordance with the peak position information output from the peak detecting circuit 38 and the average luminance level difference output from the luminance-difference detecting circuit 44. The tracing control circuit 42 is virtually constructed with a microcomputer having a program for the tracing control.

Figure 9:
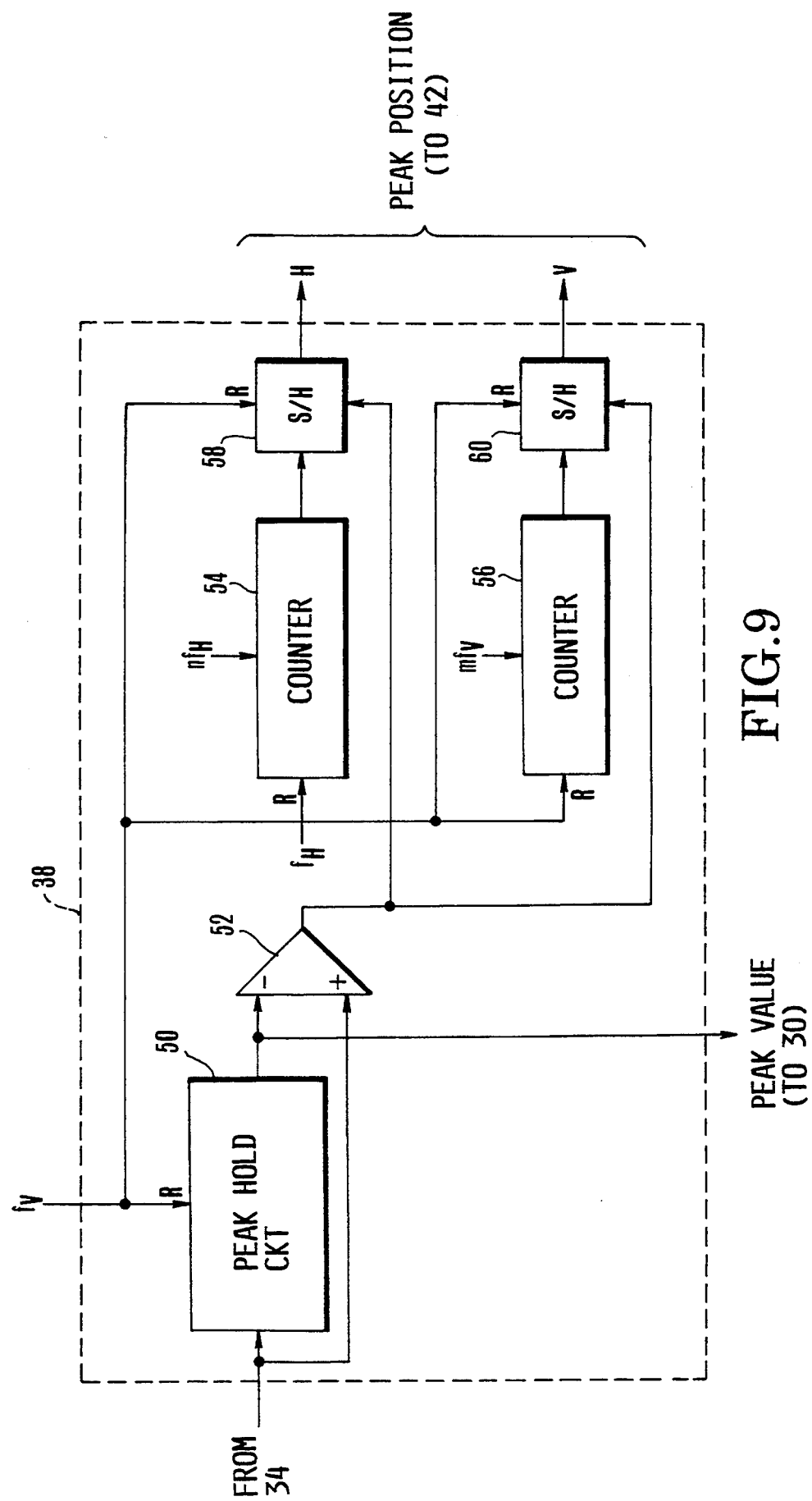
FIG. 9 is a block diagram illustrating the details of the peak detecting circuit 38 of FIG. 8.

The details of the peak detecting circuit 38 are explained with reference to FIG. 9. $f_V$ is a vertical synchronizing signal. The output of the gate circuit 34 is supplied to a peak hold circuit 50 and a comparison circuit 52. The peak hold circuit 50 is reset in each field period. The peak value held in the peak hold circuit 50 is also supplied to the comparison circuit 52. Therefore, each time the peak value to be held by the peak hold circuit 50 is renewed, the comparison circuit 52 produces a pulse. A counter 54 counts a clock of a frequency $nf_H$ (where $f_H$ is the horizontal synchronizing frequency, and n is an integer). Another counter 56 counts a clock of a frequency $mf_V$ (where $f_V$ is the vertical synchronizing frequency and m is an integer). That is, the counted value of the counter 54 represents the horizontal position in the image sensing plane shown in FIG. 11, and the counted value of the counter 56 represents the vertical position. Sample and hold (S/H) circuits 58 and 60 responsive to the output pulse of the comparison circuit 52 sample and hold respectively the counted values of the counters 54 and 56. When one field ends, the S/H circuit 58 indicates the horizontal position of the maximum peak in one field image, while the S/H circuit 60 indicates its vertical position. The S/H circuits 58 and 60 and the counter 56 are reset in each field period, while the counter 54 is reset in each horizontal scanning period.

Figure 10:
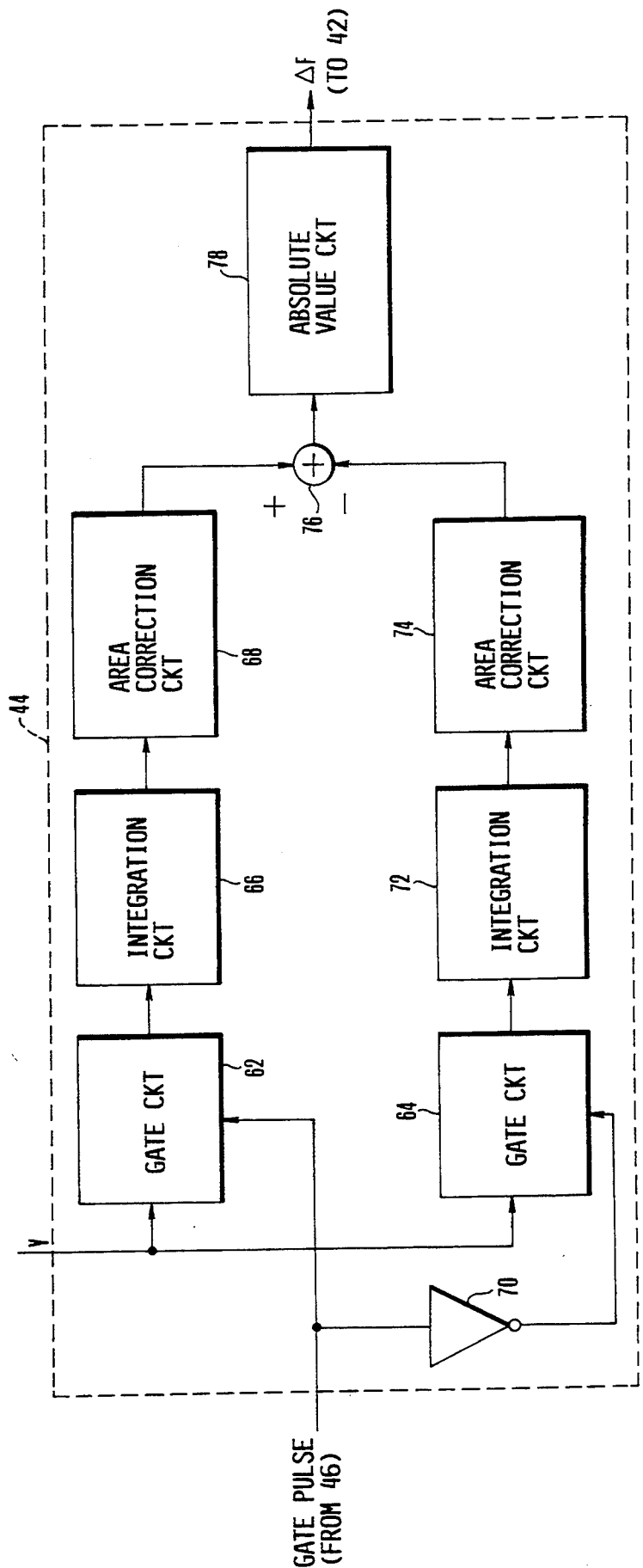
FIG. 10 is a block diagram illustrating the details of the luminance-difference detecting circuit 44 of FIG. 8.

Next, the details of the luminance difference detecting circuit 44 are explained with reference to FIG. 10. The luminance signal Y output from the signal processing circuit 28 is supplied to gate circuits 62 and 64. The gate circuit 62, responsive to a gate pulse output from the gate pulse generating circuit 46, permits only passage of the luminance signal obtained in the designated area (FIG. 11) designated by the tracing control circuit 42. An integration circuit 66 integrates that luminance signal. An area correction circuit 68 normalizes (averages) the integrated value of the integration circuit 66 by the area of the designated area. This is because the sizes of the inside and the outside of the detecting area differ from each other, and, therefore, the integrated values of the signals corresponding to the respective areas differ from each other. Hence, there is need to correct the integrated values by taking into account the sizes of the area. Another gate circuit 64 is controlled by the inverted gate pulse output from an inverter 70, in other words, permits passage of the luminance signal obtained in an area other than the designated area (FIG. 11). An integration circuit 72 integrates the output of the gate circuit 64. Similarly to the above, the integrated value is averaged by an area correction circuit 74. A subtracting circuit 76 subtracts the output of the area correction circuit 74 from the output of the area correction circuit 68. An absolute value circuit 78 produces an output representing the absolute value of the output of the subtracting circuit 76. The output $\Delta F$ of the absolute value circuit 78 is supplied to the tracing control circuit 42.

Figure 12:
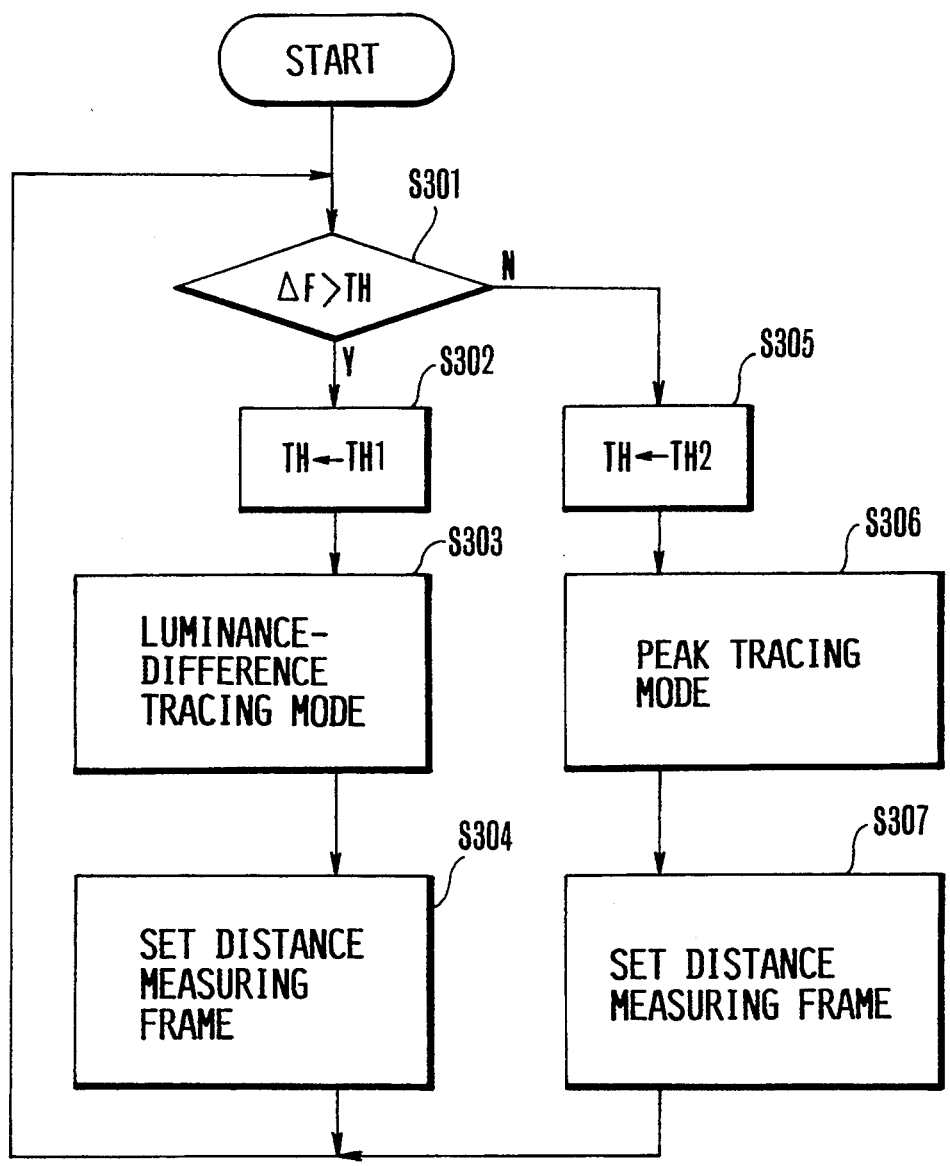
FIG. 12 is a flowchart for the fundamental operation of the tracing control circuit 42 of FIG. 8.
Figure 13:
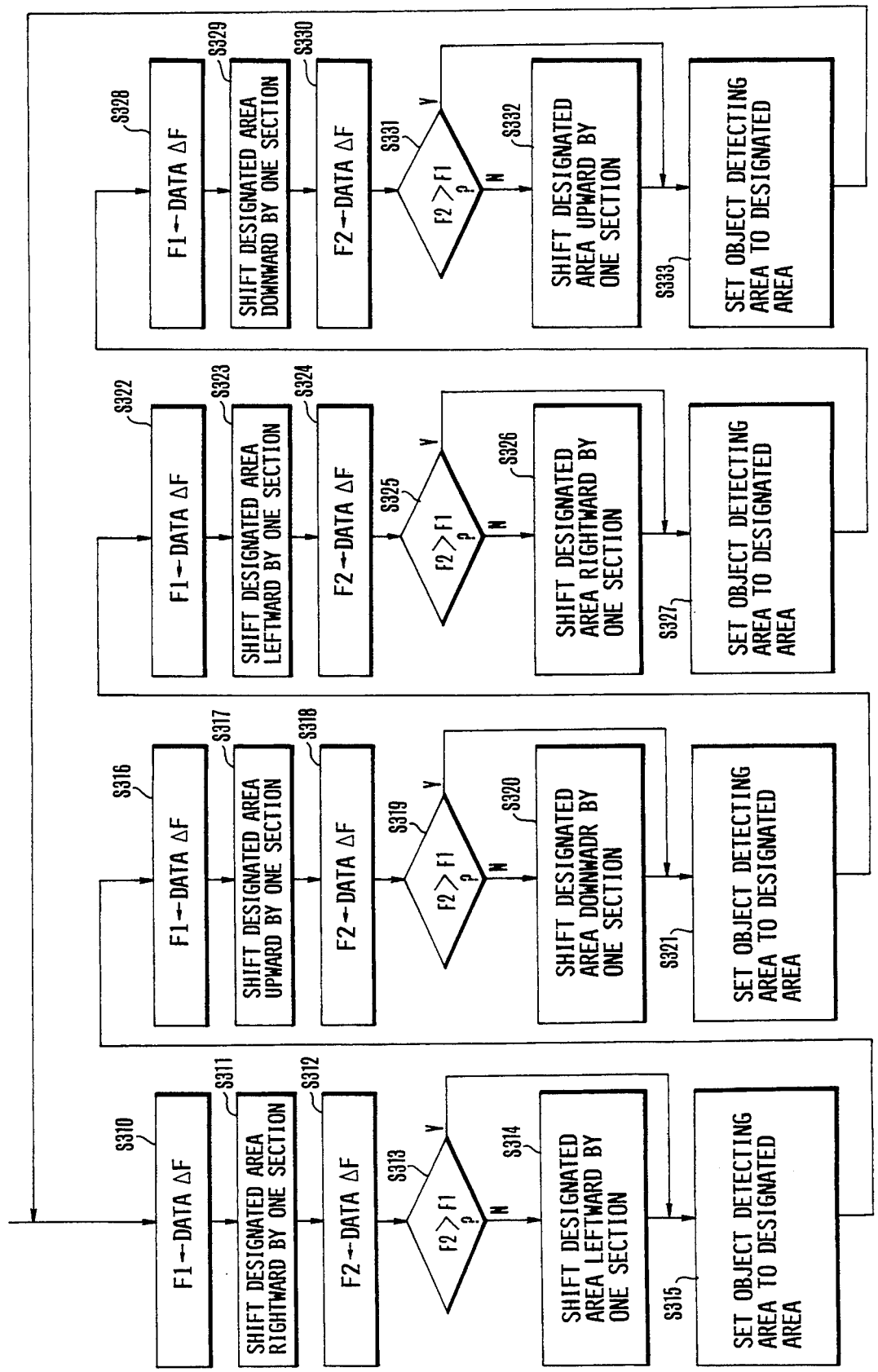
FIG. 13 is a detailed flowchart for the luminance-difference tracing mode of FIG. 12.
Figure 14:
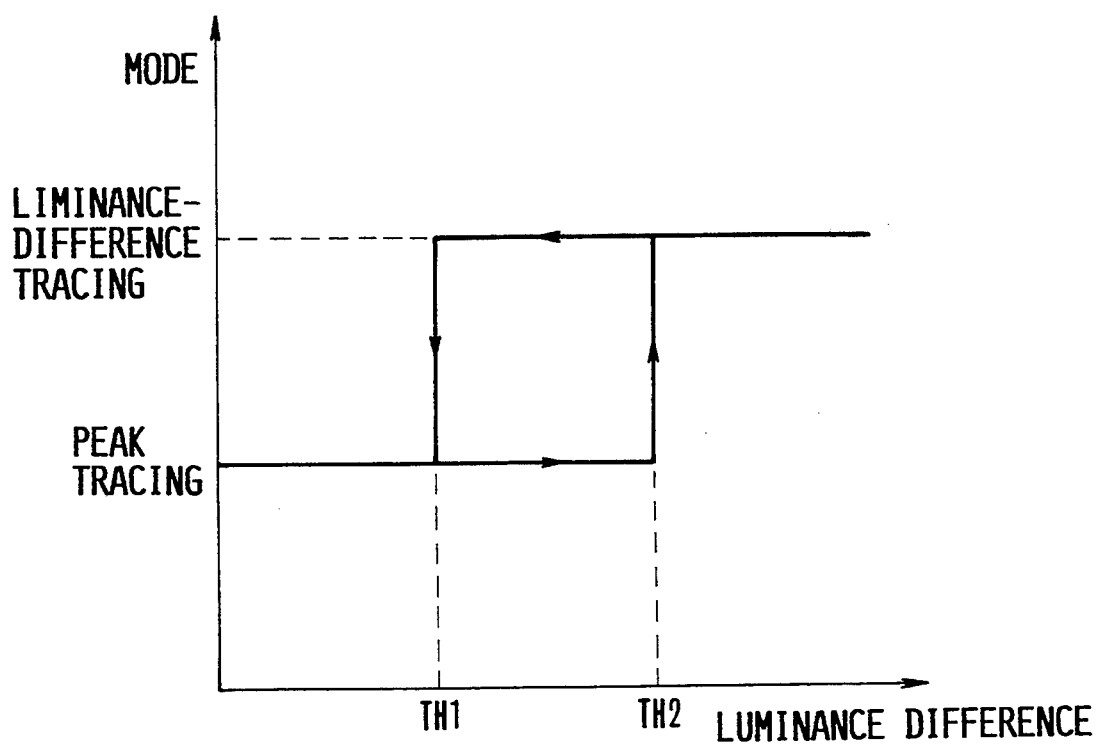
FIG. 14 is a graph showing a hysteresis characteristic of the tracing mode selection.

Referring to FIG. 12, FIG. 13 and FIG. 14, an algorithm for the operation of the tracing control circuit 42 is explained. In this embodiment, there are provided two tracing modes, namely, the luminance-difference tracing mode and the peak tracing mode. When the luminance difference between the object and the background greatly differ from each other, and when the luminance-difference signal $\Delta F$ is large, the luminance-difference tracing mode is used. When the signal ΔF is so small that the luminance-difference tracing is not adaptive, the peak tracing mode is used. In such a case, a switching from the luminance-difference tracing mode to the peak tracing mode occurs at a threshold value TH1, and the reverse switching from the peak tracing mode to the luminance-difference tracing mode occurs at another threshold value TH2, where TH2>TH1.

On tracing mode selection (or supply of electrical power), at first, as the threshold TH for tracing mode switching, the value TH1 is set. Then the luminance-difference signal ΔF output from the luminance-difference detecting circuit 44 is compared with the value TH (S301). If the signal ΔF is larger than the value TH, then the value TH is set to the value TH1 (S302) to render operative the luminance-difference tracing mode (S303). The distance measuring frame is adjusted to an object detecting area which is set when the luminance-difference tracing mode is selected (S304). Then the process returns to the step S301. Also, if the signal ΔF is not larger than the value TH, then the value TH is set to the value TH2 (S305) to render operative the peak tracing mode (S306). In the peak tracing mode, on the image sensing plane, the object detecting area is set with its center at the peak position detected by the peak detecting circuit 38. The distance measuring frame is adjusted to the thus set object detecting area (S307). Then the process returns to the step S301.

By this, when selecting one of the different tracing modes according to the situation of the object changes, even if the luminance difference lies near the limit level of allowance of the luminance-difference tracing, its switching operation can be carried out always stably without causing huntings to occur.

FIG. 13 shows the fundamental flowchart for the luminance-difference tracing mode in the step S303 of FIG. 12. The fundamental principle is briefly explained. As shown in FIG. 11, the image sensing plane is divided into m×n sections. The designated area is shifted, for example, section by section upward, downward, leftward and rightward. In each of the positions, the absolute value of the difference in the level of average luminance between the inside and the outside of the designated area is computed. On judgment that the object has moved to the position where that absolute value becomes maximum, the object detecting area is moved. To explain FIG. 13, the output ΔF of the luminance-difference detecting circuit 44 is taken in and substituted for a variable F1 (S310). The designated area is shifted one section to the right (S311), where the output ΔF of the luminance-difference detecting circuit 44 is taken in and substituted for a variable F2 (S312). The value F1 and the value F2 are compared with each other (S313). If F2≦F1, as it implies that even the rightward shifting does not increase the value ΔF, the designated area is then shifted to the left (S314). Then, the object detecting area is adjusted to the designated area (S315).

In steps S316 to S321, a one-section upward shifting is attempted. Responsive to its result, the object detecting area is moved. In steps S322 to S327, a one-section leftward shifting is attempted. Responsive to its result, the object detecting area is moved. In steps S328 to S333, a one-section downward shifting is attempted. Responsive to its result, the object detecting area is moved. After the step S333, the process returns to the step S310.

Though the foregoing has been described by taking an example of the focus adjustment, it is to be understood that the invention is not confined to the focus adjustment but is applicable to light quantity adjustments, etc., of course.

As is understandable from the foregoing description, according to the invention, even when the difference in average video signal level between the object and its background is small, good object tracing can be realized. In addition, because the changing over between the tracing modes is operated with the help of the hysteresis characteristics, frequent switchings are prevented from occurring. Hence, the use of switched tracing modes does not cause the operation to become abnormal.

What is claimed is:

1. An object tracing device for tracing an object image on an image sensing plane, comprising:
   (A) setting means for movably setting a detecting area on said image sensing plane;
   (B) first object tracing means, having means for respectively detecting luminance level between the inside and outside of said detecting area, for controlling said setting means to vary a set position of said detecting area on said image sensing plane so that the difference in luminance level between the inside and the outside of said detecting area becomes greater;
   (C) second object tracing means for controlling said setting means to vary the set position of said detecting area on said image sensing plane so that a position at which a contrast on said image sensing plane becomes maximum coincides with a central portion of said detecting area; and
   (D) control means for selectively operating one of said first object tracing means and said second object tracing means.

2. A device according to claim 1, wherein said first object tracing means sets said detecting area to a position at which the difference in average luminance level between the inside and the outside of said detecting area becomes maximum.

3. A device according to claim 2, wherein said first object tracing means controls said setting means to perform such a wobbling that said detecting area is shifted upward, downward, to the left and to the right in units of a predetermined distance repeatedly, to control said setting means to move said detecting area to the set position where the difference in average luminance level between the inside and the outside of said detecting area becomes maximum.

4. A device according to claim 3, wherein said first object tracing means includes gate circuits for extracting the respective image signals corresponding to the inside and the outside of said detecting area, integration circuits for integrating the respective image signals output from said gate circuits, correction circuits for correcting the error caused on the basis of the difference in area between the inside and the outside of said detecting area so as to normalize the integrated value output from said correction circuits, and a subtracting circuit for obtaining the difference between outputs of said correction circuits.

5. A device according to claim 1, wherein said second object tracing means sets the position of said detecting area so that a position where a contrast on said detecting area becomes maximum coincides with a central portion of said detecting area.

6. A device according to claim 5, wherein said second object tracing means includes horizontal peak-value/peak-position detecting means having a sample-and-hold circuit in holding a peak value in every one horizontal scanning in said detecting area and a counter for detecting a position at which said peak value is detected in said one horizontal scanning, and vertical peak-value/peak-position detecting means having a sample-and-hold circuit for holding a peak value in every one vertical scanning in said detecting area and a counter for detecting a position at which said peak value is detected in said one vertical scanning.

7. A device according to claim 1, wherein said control means selects one of said first and said second object tracing means in accordance with a state of said image sensing plane.

8. A device according to claim 7, further comprising integration means for integrating luminance signal components corresponding to the inside and the outside of said detecting area, and wherein said control means, responsive to a difference in integrated luminance level integrated by said integration means between the inside and the outside of said detecting area, adaptively selects one of said first object tracing means and said second object tracing means.

9. A device according to claim 8, wherein said control means selects said first object tracing means when the difference in average luminance level between the inside and the outside of said detecting area is larger than a predetermined value, and selects said second object tracing means when said difference in average luminance level is not larger than said predetermined value.

10. A device according to claim 1, further comprising focus detecting means for detecting the degree of focus to the object image on the basis of an image signal corresponding to the inside of said detecting area.

11. A device according to claim 10, wherein said focus detecting means detects the degree of focus on the basis of the quantity of a high-frequency component in said image signal.

12. An object tracing type automatic focusing device for keeping an object image in an in-focus state by tracing the object image on an image sensing plane, comprising:
(A) means for movably setting a focus detecting area on said image sensing plane;
(B) setting means for movably setting an object tracing area on said image sensing plane;
(C) first object tracing means, having means for respectively detecting luminance level between the inside and outside of said object tracing area , for controlling said setting means to vary a set position of said object tracing area on said image sensing plane so that the difference in luminance level between the inside and the outside of said object tracing area becomes greater;
(D) second object tracing means for controlling said setting means to vary the set position of said object tracing area on said image sensing plane so that a position at which a contrast on said image sensing plane becomes maximum coincides with a central portion of said object tracing area;
(E) control means for selectively operating one of said first object tracing means and said second object tracing means; and
(F) means for setting said focus detecting area to a position in said object tracing area.

13. A device according to claim 12, wherein said object tracing area serves also as said focus detecting area.

14. A device according to claim 12, wherein said first object tracing means sets said object tracing area to a position at which the difference in average luminance level between the inside and the outside of said object tracing area becomes maximum.

15. A device according to claim 14, wherein said first object tracing means controls said setting means to perform such a wobbling that said object tracing area is shifted upward, downward, to the right, to the left in units of a predetermined distance repeatedly, and to move said object tracing area to the shifting position at which the difference in average luminance level between the inside and the outside of said object tracing area becomes maximum.

16. A device according to claim 15, wherein said first object tracing means includes gate circuits for extracting the respective image signals corresponding to the inside and the outside of said object tracing area, integrating circuits for integrating the respective image signals output from said gate circuits, correction circuits for correcting the error caused on the basis of the difference in area between the inside and the outside of said object tracing area so as to normalize the integrated value output from said correction circuits, and a subtracting circuit for obtaining the difference between outputs of said correction circuits.

17. A device according to claim 12, wherein said second object tracing means sets the position of said object tracing area so that a position at which a contrast on said object tracing area becomes maximum coincides with a central portion of said object tracing area.

18. A device according to claim 17, wherein said second object tracing means includes horizontal peak-value/peak-position detecting means having a sample-and-hold circuit for holding a peak value in every one horizontal scanning in said object tracing area and a counter for detecting a position at which said peak value is detected in said one horizontal scanning, and vertical peak-value/peak-position detecting means having a sample-and-hold circuit for holding a peak value in every one vertical scanning in said object tracing area and a counter for detecting a position at which said peak value is detected in said one vertical scanning.

19. A device according to claim 12, wherein said control means selects one of said first and said second object tracing means in accordance with a state of said image sensing plane.

20. A device according to claim 19, wherein said first object tracking means has integration circuits for respectively detecting average luminance level of the inside and outside of said object tracing area, and said control means adaptively selects one of said first object tracing means and said second object tracing means in response to a difference in integrated luminance level between the inside and the outside of said object tracing area integrated by said integration circuits.

21. A device according to claim 20, wherein said control means selects said first object tracing means when the difference in average luminance level between the inside and the outside of said object tracing area is larger than a predetermined value, and selects said second object tracing means when said difference in average luminance level is not larger than said predetermined value.

22. An automatic focusing device for focusing on an object image on an image sensing plane by tracing the object image, comprising:
   (A) focus detecting means for detecting an in focus state on the basis of an image signal corresponding to a focus detecting area set on said image sensing plane;
   (B) first area setting means for varying the position of said set focus detecting area on said image sensing plane so that the difference in average luminance level between the inside and the outside of said focus detecting area becomes larger;
   (C) second area setting means for varying the position of said set focus detecting area on said image sensing plane so that a contrast of a central portion of said focus detecting area on said image sensing plane becomes maximum; and
   (D) control means for selectively operating one of said first area setting means and said second area setting means.

23. A device according to claim 22, wherein said first area setting means sets said focus detecting area so that the difference in average luminance level between the inside and the outside of said focus detecting area becomes maximum.

24. A device according to claim 22, wherein said control means selects one of said first and said second area setting means in accordance with a state of said image sensing plane.

25. A device according to claim 24, wherein said control means selects said first area setting means when the difference in average luminance level between the inside and the outside of said focus detecting area is larger than a predetermined value, and selects said second area setting means when said difference in average luminance level is not larger than said predetermined value.

26. An object tracing device for tracing an object image on an image sensing plane, comprising:
   (A) first object tracing means for varying a set position of a detecting area on said image sensing plane so that the difference in luminance level between the inside and the outside of said detecting area becomes larger;
   (B) second object tracing means for varying the set position of said detecting area on said image sensing plane so that a contrast of a central portion of said detecting area on said image sensing plane becomes maximum; and
   (C) control means for selectively operating one of said first object tracing means and said second object tracing means, wherein;
   a selecting operation of said control means has a hysteresis characteristic in which a threshold value at which a selection is changed from said first object tracing means to said second object tracing means differs from a threshold value at which a selection is changed from said second object tracing means to said first object tracing means.

27. A device according to claim 26, wherein said first object tracing means sets said detecting area so that the difference in average luminance level between the inside and the outside of said detecting area becomes maximum.

28. A device according to claim 27, wherein said first object tracing means controls said setting means to perform such a wobbling that said detecting area is shifted upward, downward, to the left and to the right in units of a predetermined distance repeatedly, and to move said detecting area to the position of said detecting area at which the difference in average luminance level between the inside and the outside of said detecting area becomes maximum.

29. A device according to claim 28, wherein said first object tracing means includes gate circuits for extracting the respective image signals corresponding to the inside and the outside of said detecting area, integration circuits for integrating the respective image signals output from said gate circuits, area correction circuits for correcting the difference in area between the inside and the outside of said detecting area with respect to integrated values output from said integration circuits, and a subtracting circuit for obtaining the difference between outputs of said area correction circuits.

30. A device according to claim 26, wherein said second object tracing means sets the position of said detecting area so that a contrast of a central portion of said detecting area on said image sensing plane becomes maximum.

31. A device according to claim 30, wherein said second object tracing means includes horizontal peak-value/peak-position detecting means having a sample-and-hold circuit for holding a peak value in every one horizontal scanning in said detecting area and a counter for detecting a position at which said peak value is detected in said one horizontal scanning, and vertical peak-value/peak-position detecting means having a sample-and-hold circuit for holding a peak value in every one vertical scanning in said detecting area and a counter for detecting a position at which said peak value is detected in said one vertical scanning.

32. A device according to claim 26, wherein said control means, responsive to the difference in luminance level between the inside and the outside of said detecting area, adaptively selects one of said first object tracing means and said second object tracing means.

33. A device according to claim 32, wherein said control means selects said first object tracing means when the difference in average luminance level between the inside and the outside of said detecting area is larger than a predetermined value, and selects said second object tracing means when said difference in average luminance level is not larger than said predetermined value.

34. A device according to claim 33, further comprising focus detecting means for detecting a degree of focus to of said object image on the basis of a high frequency component of an image signal corresponding to the inside of said detecting area.

35. An image sensing apparatus comprising:
   (A) first tracing means for detecting a feature of an image on an image sensing plane and for tracing a motion of said feature;
   (B) second tracing means for detecting a feature of said image having a different detection characteristic from that of said first tracing means; and
   (C) control means for selectively operating one of said first tracing means and said second tracing means in accordance with a detecting condition of the image on said image sensing plane on the basis of detecting information of said first or second tracing means, in which a selecting operation of said control means has a hysteresis characteristic in changing operation between said first and second tracing means.

36. An apparatus according to claim 35, said first tracing means detects said feature and traces said feature in a first detecting area so that a difference in luminance level between the inside and the outside of the first detecting area becomes maximum, and wherein said second tracing means detects said feature and traces said feature in a second detecting area so that a contrast of a central portion of said second detecting area becomes maximum.

37. An apparatus according to claim 36, wherein said control means selects one of said first and said second tracing means in accordance with the difference in luminance level between the inside and the outside of said second detecting area.

38. A device according to claim 37 in which said first and second detecting areas are common with said detecting area.

39. An apparatus according to claim 35, wherein said detecting area is a focus detecting area.

40. An apparatus according to claim 35, wherein said detecting area is a light measuring area.

41. An automatic focus detecting device, comprising:
(A) image sensing means for sensing an object image formed on an image sensing plane and for photoelectrically converting said object image into an image signal and outputting said image signal;
(B) focus detecting means for extracting a predetermined signal component varying according to a focus condition from the image signal corresponding to a detecting area set on said image sensing plane; and
(C) detecting area setting means having a first mode for setting said detecting area on said image sensing plane on the basis of a first algorithm and having a second mode for setting said detecting area on the basis of a second algorithm different from said first algorithm wherein said detecting area setting means has a hysteresis characteristic in the changing operation between said first and second modes.

42. A device according to claim 41, wherein said detecting area setting means includes level detecting means for detecting an average luminance level inside and outside of said detecting area and wherein said detecting area is set at a position where a difference in luminance level between the inside and the outside of said detecting area detected by said level detecting means in said first mode becomes maximum.

43. A device according to claim 41, wherein said detecting area setting means includes peak detecting means for detecting a peak value of a high frequency component in said image signal corresponding to said detecting area, and said detecting area is set at a peak detecting position detected by said peak detecting means in said second mode.

44. An automatic exposure control device, comprising:
(A) image sensing means for sensing an object image formed on an image sensing plane and for photoelectrically converting said object image into an image signal and outputting said image signal;
(B) exposure detecting means for extracting a predetermined signal component according to an exposure condition from the image signal corresponding to a detecting area set on said image sensing plane; and
(C) detecting area setting means having a first mode for setting said detecting area on said image sensing plane according to a first algorithm and a second mode for setting said detecting area according to a second algorithm different from said first algorithm.

45. A device according to claim 44, wherein said detecting area setting means has a hysteresis characteristic in the changing operation between said first mode and said second mode.

46. A device according to claim 45, wherein said detecting area setting means includes level detecting means for detecting an average luminance level inside and outside of said detecting area and wherein said detecting area is set at a position where a difference in luminance level between the inside and the outside of said detecting area detected by said level detecting means in said first mode becomes maximum.

47. A device according to claim 45, wherein said detecting area setting means includes peak detecting means for detecting a peak value of a high frequency component in said image signal corresponding to said detecting area, and said detecting area is set at a peak detecting position detected by said peak detecting means in said second mode.

48. A video camera device comprising:
(A) image sensing means for sensing an object image formed on an image sensing plane and for photoelectrically converting said object image into an image signal and outputting said image signal;
(B) detecting means for extracting a predetermined signal component according to a photographing condition from the image signal corresponding to a detecting area set on said image sensing plane; and
(C) detecting area setting means having a first mode for setting said detecting area on said image sensing plane according to a first algorithm and a second mode for setting said detecting area according to a second algorithm different from said first algorithm, said detecting area setting means having a hysteresis characteristic in changing operation between said first mode and said second mode.

49. A device according to claim 48, wherein said detecting area is a focus detecting area.

50. A device according to claim 49, wherein said detecting area is an exposure detecting area.

* * * * *

UNITED STATES PATENT AND TRADEMARK OFFICE
CERTIFICATE OF CORRECTION

PATENT NO. : 5,442,397
DATED : August 15, 1995
INVENTOR(S) : Katsuji Yoshimura et al.

It is certified that error appears in the above-indentified patent and that said Letters Patent is hereby corrected as shown below:

Cover Page, Item [54]. Change "IMAGE SENSING APPARATUS" to -- DEVICE FOR TRACING MOVEMENT OF AN OBJECT IMAGE ON AN IMAGE SENSING PLANE --.

Col. 1, line 2. Change "IMAGE SENSING APPARATUS" to -- DEVICE FOR TRACING MOVEMENT OF AN OBJECT IMAGE ON AN IMAGE SENSING PLANE --.

Col. 12, line 60. Change "value" to -- values --.

Col. 14, line 14. Delete "shifting" and after "position" insert -- of said detecting area --.

Col. 14, line 27. Change "value" to -- values --.

Signed and Sealed this

Fifth Day of December, 1995

Attest:

BRUCE LEHMAN

Attesting Officer           Commissioner of Patents and Trademarks